(12) United States Patent
Elliott (10) Patent No.: US 11,649,040 B2
(45) Date of Patent: May 16, 2023

(54) PROVIDING CONTINUOUSLY VARIABLE FEEL FORCES FOR FULLY-POWERED FLIGHT CONTROL SYSTEMS

(71) Applicant: The Boeing Company, Chicago, IL (US)

(72) Inventor: Joseph E. Elliott, Shoreline, WA (US)

(73) Assignee: Tlie Boeing Company, Chicago, IL (US)

( * ) Notice: Subject to any disclaimer, the term of this patent is extended or adjusted under 35 U.S.C. 154(b) by 176 days.

(21) Appl. No.: 17/338,300

(22) Filed: Jun. 3, 2021

(65) Prior Publication Data

US 2022/0024563 A1     Jan. 27, 2022

Related U.S. Application Data

(60) Provisional application No. 63/056,458, filed on Jul. 24, 2020.

(51) Int. Cl.
| | |
|---|---|
| *B64C 13/28* | (2006.01) |
| *B64C 13/04* | (2006.01) |
| *B64D 31/10* | (2006.01) |
| *B64C 13/18* | (2006.01) |
| *G01L 5/22* | (2006.01) |

(52) U.S. Cl.
CPC .......... *B64C 13/345* (2018.01); *B64C 13/044* (2018.01); *B64C 13/0423* (2018.01); *B64C 13/18* (2013.01); *B64D 31/10* (2013.01); *G01L 5/225* (2013.01)

(58) Field of Classification Search
CPC ........................... B64C 13/345; B64C 13/0423
See application file for complete search history.

(56) References Cited

U.S. PATENT DOCUMENTS

| | | |
|---|---|---|
| 2004/0078121 A1 | 4/2004 | Cartmell et al. |
| 2012/0053735 A1 | 3/2012 | Tessier et al. |

FOREIGN PATENT DOCUMENTS

| | | |
|---|---|---|
| EP | 2701976 A1 | 3/2014 |
| EP | 3659910 A1 | 6/2020 |

OTHER PUBLICATIONS

Extended European Search Report dated Dec. 8, 2021, from corresponding European Application No. 21180066.9, 7 pages.

*Primary Examiner* — Nicholas McFall
(74) *Attorney, Agent, or Firm* — Haynes and Boone, LLP (57) ABSTRACT

In one or more embodiments, a method for providing continuously variable feel forces for an aircraft comprises sensing, by each of at least one sensor associated with at least one aircraft control, a force sensor value. The method further comprises determining a net force value by using the force sensor value for each of at least one sensor. Also, the method comprises comparing the net force value to a desired breakout force. In addition, the method comprises determining whether the net force value exceeds the desired breakout force. Additionally, the method comprises determining an adjusted force value by using the desired breakout force and the net force value, when the net force value exceeds the desired breakout force. Also, the method comprises determining an actuator torque command based on the adjusted force value. Further, the method comprises commanding an autopilot actuator with the actuator torque command to apply torque.

20 Claims, 6 Drawing Sheets

PROVIDING CONTINUOUSLY VARIABLE FEEL FORCES FOR FULLY-POWERED FLIGHT CONTROL SYSTEMS

CROSS REFERENCE TO RELATED APPLICATIONS

The present application claims priority to Provisional U.S. Patent Application Ser. No. 63/056,458, filed Jul. 24, 2020, which is hereby incorporated by reference in its entirety.

FIELD

The present disclosure relates to feel forces for flight control systems. In particular, the present disclosure relates to providing continuously variable feel forces for fully-powered flight control systems.

BACKGROUND

In some phases of flight (e.g., during takeoff) of an aircraft, reduced feel forces for aircraft controls (e.g., the control yoke(s) and/or the rudder pedals of the cockpit) are desirable for the pilot. Providing variable "feel" forces to the pilots of aircraft with fully-powered flight controls has historically involved substantial complexity. For example, in older applications, variable feel forces were achieved by mechanical means (e.g., pneumatic and/or hydraulic means) of altering the spring geometry. In contemporary applications, variable feel forces have been achieved by electronic means of controlling motors to emulate the behavior of springs. The complexity required for both of these solutions comes with an undesirable cost.

In light of the foregoing, there is a need for an improved design for providing variable feel forces for aircraft controls.

SUMMARY

The present disclosure relates to a method, system, and apparatus for providing continuously variable feel forces for fully-powered flight control systems. In one or more embodiments, a method for providing continuously variable feel forces for an aircraft comprises sensing, by each of at least one sensor associated with at least one aircraft control, a force sensor value. The method further comprises determining, by at least one processor, a net force value by using the force sensor value for each of at least one sensor. Also, the method comprises comparing, by at least one processor, the net force value to a desired breakout force. In addition, the method comprises determining, by at least one processor, whether the net force value exceeds the desired breakout force. Additionally, the method comprises determining, by at least one processor, an adjusted force value by using the desired breakout force and the net force value, when the net force value exceeds the desired breakout force. Also, the method comprises determining, by at least one processor, an actuator torque command based on the adjusted force value. Further, the method comprises commanding, by at least one processor, an autopilot actuator with the actuator torque command to apply torque.

In at least one embodiment, there are at least two sensors. In one or more embodiments, the sensors are associated with control yokes of the aircraft. In some embodiments, at least one of the sensors is associated with a right rudder pedal, and another one of at least one of the sensors is associated with a left rudder pedal.

In one or more embodiments, the method further comprises determining, by at least one processor, whether there is an engine failure on the aircraft. In at least one embodiment, the method further comprises determining, a thrust asymmetry offset value, when there is an engine failure. In some embodiments, the method further comprises determining, by at least one processor, a compensated pedal force value based on the adjusted force value and the thrust asymmetry offset value.

In one or more embodiments, the desired breakout force is predetermined.

In at least one embodiment, the method further comprises determining, by at least one processor, whether reduced feel forces for at least one aircraft control associated with each of at least one sensor are desired. In one or more embodiments, the method further comprises engaging, by the autopilot actuator, in torque-commanded mode, when reduced feel forces are desired. In some embodiments, at least one processor determines whether reduced feel forces are desired based on a phase of flight of the aircraft.

In one or more embodiments, the autopilot actuator is a pedal autopilot actuator or a control yoke autopilot actuator.

In at least one embodiment, a system for providing continuously variable feel forces for an aircraft comprises at least one aircraft control. The system further comprises at least one sensor associated with each of at least one aircraft control. In one or more embodiments, each of at least one sensor is configured to sense a force sensor value. Also, the system comprises at least one processor configured: to determine a net force value by using the force sensor value for each of at least one sensor; to compare the net force value to a desired breakout force; to determine whether the net force value exceeds the desired breakout force; to determine an adjusted force value by using the desired breakout force and the net force value, when the net force value exceeds the desired breakout force; to determine an actuator torque command based on the adjusted force value; and to command an autopilot actuator with the actuator torque command to apply torque.

In one or more embodiments, at least one processor is further configured to determine whether there is an engine failure on the aircraft. In at least one embodiment, at least one processor is further configured to determine a thrust asymmetry offset value, when there is an engine failure. In some embodiments, at least one processor is further configured to determine a compensated pedal force value based on the adjusted force value and the thrust asymmetry offset value.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide operative systems for providing continuously variable feel forces for fully-powered flight control systems. In one or more embodiments, the system of the present disclosure provides variable feel forces for aircraft controls by using existing conventional hardware (e.g., a conventional autopilot backdrive actuator) currently on many aircraft with fully-powered flight control systems.

As previously mentioned above, in some phases of flight (e.g., during takeoff) of an aircraft, reduced feel forces for aircraft controls (e.g., the control yoke(s) and/or the rudder pedals of the cockpit) are desirable for the pilot. Providing variable "feel" forces to the pilots of aircraft with fully-powered flight controls has historically involved substantial complexity. For example, in older applications, variable feel forces were achieved by mechanical means (e.g., pneumatic and/or hydraulic means) of altering the spring geometry. In contemporary applications, variable feel forces have been achieved by electronic means of controlling motors to emulate the behavior of springs. The complexity required for both of these solutions comes with an undesirable cost.

The disclosed system employs a flight control system comprising a conventional simple mechanical spring "feel" system and a conventional autopilot backdrive actuator, along with the addition of appropriate force sensors and control logic, to provide the same functionality (e.g., provide variable "feel" forces) as the more complex "variable feel" solutions mentioned above (e.g., the mechanical and electronic "variable feel solutions"). During operation of the disclosed system, the autopilot backdrive actuator operates in a new torque-command mode and is commanded proportionality to applied pilot forces measured (sensed) by force sensors, to effectively turn the existing autopilot backdrive actuator into a boost servo that can effectively subtract from the "feel" forces provided by the conventional simple mechanical spring "feel" system.

Implementing the disclosed system to provide variable "feel" forces to pilots of aircraft with fully-powered flight controls does not require a significant cost increase over the conventional simple mechanical spring "feel" systems. Providing variable "feel" forces to pilots by using repurposed existing hardware (e.g., the autopilot backdrive actuator), instead of using the more complex "feel" solutions, reduces the complexity, costs, and weight of the aircraft. The disclosed system allows for a reduced complexity (and, thus, reduced cost) in terms of both mechanical moving parts and sophisticated closed-loop electronic control systems.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to aircraft controls, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

Figure 1:
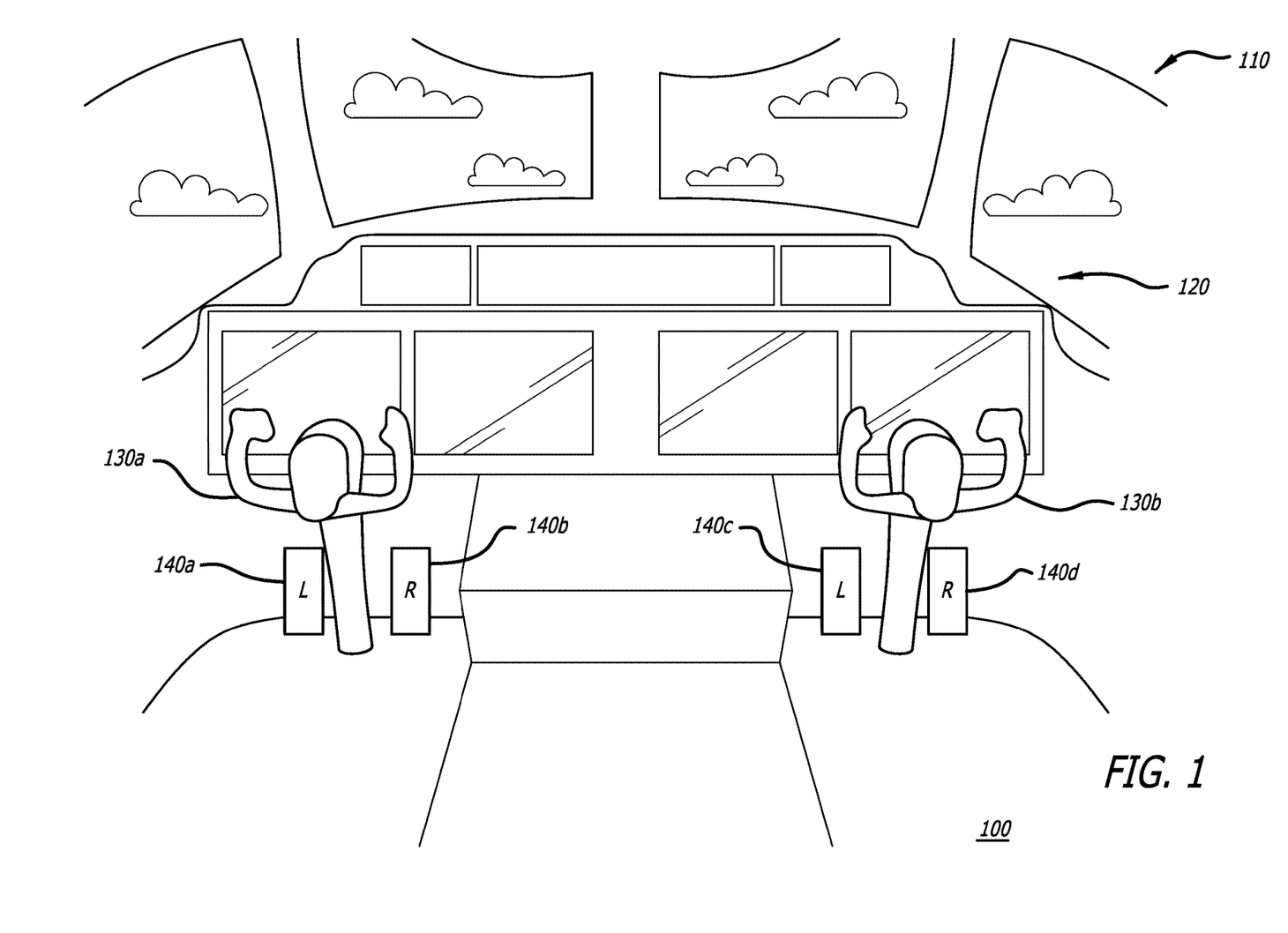
FIG. 1 is a diagram showing an exemplary cockpit of an aircraft, which may employ the disclosed system for providing continuously variable feel forces for aircraft with fully-powered flight control systems, in accordance with at least one embodiment of the present disclosure.

FIG. 1 is a diagram 100 showing an exemplary cockpit 120 of an aircraft 110, which may employ the disclosed system for providing continuously variable feel forces for aircraft with fully-powered flight control systems, in accordance with at least one embodiment of the present disclosure. In this figure, the cockpit 120 of the aircraft 110 is shown to comprise a plurality of aircraft controls for two pilots to operate. The aircraft controls of the cockpit 120 comprise control yokes 130a, 130b and rudder pedals 140a, 140b, 140c, 140d. In particular, the aircraft controls for a first pilot comprise the control yoke 130a, the left rudder pedal 140a, and the right rudder pedal 140b. And, the aircraft controls for a second pilot comprise the control yoke 130b, the left rudder pedal 140c, and the right rudder pedal 140d.

It should be noted that, in one or more embodiments, the cockpit 120 of the aircraft 110 may comprise more or less aircraft controls than as shown in FIG. 1, and may comprise different types of aircraft controls than the ones (e.g., the control yokes 130a, 130b and rudder pedals 140a, 140b, 140c, 140d) as are shown in FIG. 1. In addition, in one or more embodiments, the aircraft 110 may be any type of aircraft with a fully-powered flight control system(s) including, but not limited to, civilian airplanes and military airplanes.

During flight of the aircraft 110, the pilots use the control yokes 130a, 130b to control the attitude of the aircraft 110, usually in both pitch and roll. When a control yoke 130a, 130b is pulled back by a pilot (i.e. pulled in towards the pilot's chest), the nose of the aircraft 110 rises. And, conversely, when the control yoke 130a, 130b is pushed forward by a pilot (i.e. pushed away from the pilot's chest), the nose of the aircraft 110 is lowered.

When a pilot pulls back on a control yoke 130a, 130b to raise the nose of the aircraft 110, a conventional simple mechanical spring mechanism connected to the control yoke 130a, 130b, will provide an artificial resistive "feel" force to the pilot. The further the pilot pulls back on the control yoke 130a, 130b, the greater the resistive "feel" force the spring mechanism will provide to the pilot.

Also during flight of the aircraft 110, the pilots use the rudder pedals 140a, 140b, 140c, 140d to control the rudder on the vertical stabilizer of the aircraft 110 to control the yaw of the aircraft 110. The left rudder pedals 140a, 104c are depressed (e.g., pushed down on by a pilot) to move the rudder to the left to turn the nose of the aircraft 110 to the left. And, the right rudder pedals 140b, 140d are depressed (e.g., pushed down on by a pilot) to move the rudder to the right to turn the nose of the aircraft 110 to the right.

When a pilot depresses a rudder pedal 140a, 140b, 140c, 140d (i.e. pushes down on a rudder pedal 140a, 140b, 140c, 140d), a conventional simple mechanical spring mechanism connected to the rudder pedal 140a, 140b, 140c, 140d will provide an artificial resistive "feel" force to the pilot. The more the pilot depresses the rudder pedal 140a, 140b, 140c, 140d, the greater the resistive "feel" force the spring mechanism will provide to the pilot.

Figure 2:
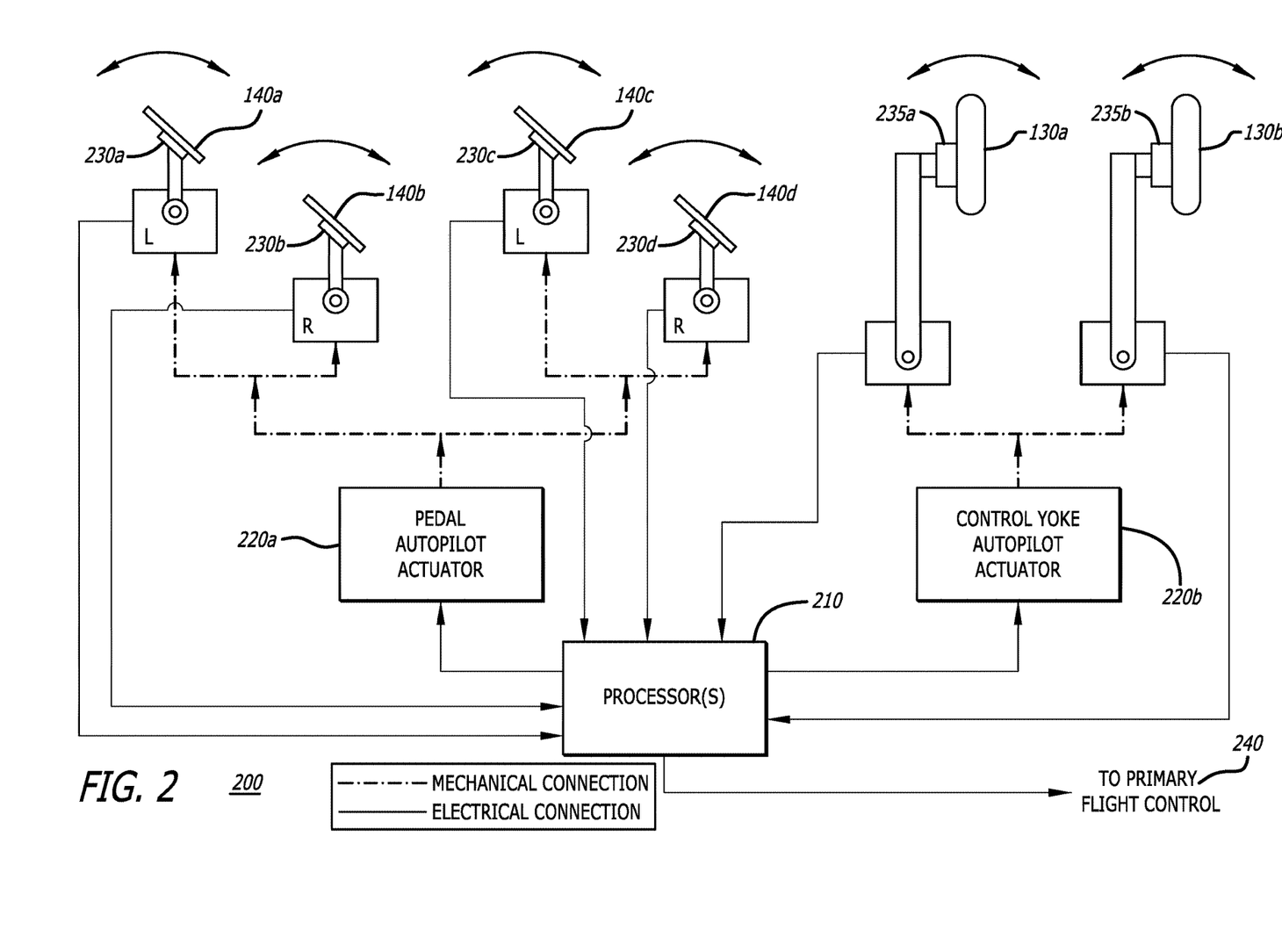
FIG. 2 is a schematic diagram showing the disclosed system for providing continuously variable feel forces for aircraft with fully-powered flight control systems, in accordance with at least one embodiment of the present disclosure.

FIG. 2 is a schematic diagram showing the disclosed system 200 for providing continuously variable feel forces for aircraft with fully-powered flight control systems, in accordance with at least one embodiment of the present disclosure. In this figure, the system 200 is shown to comprise the aircraft controls of the aircraft 110 (refer to FIG. 1) for two pilots (e.g., a first pilot and a second pilot). These aircraft controls comprise, for a first pilot, a control yoke 130a, a left rudder pedal 140a, and a right rudder pedal 140b. And, the aircraft controls comprise, for a second pilot, a control yoke 130b, a left rudder pedal 140c, and a right rudder pedal 140d. It should be noted that, in one or more embodiments, the system 200 may comprise more or less aircraft controls than as shown in FIG. 2.

Also in this figure, the system 200 is shown to comprise sensors (e.g., force sensors) 230a, 230b, 230c, 230d, 235a, 235b respectively connected (e.g., communicatively coupled) to the aircraft controls (e.g., the control yokes 130a, 130b; the left rudder pedals 140a, 140c; and the right rudder pedals 140b, 140d), In particular, sensor 230a is connected to the left rudder pedal 140a for the first pilot, sensor 230b is connected to the right rudder pedal 140b for the first pilot, sensor 235a is connected to the control yoke 130a for the first pilot, sensor 230c is connected to the left rudder pedal 140c for the second pilot, sensor 230d is connected to the right rudder pedal 140d for the second pilot, and sensor 235b is connected to the control yoke 130b for the second pilot. It should be noted that, in one or more embodiments, the system 200 may comprise more than one sensor connected to each aircraft control than as is shown in FIG. 2.

In addition, the system 200 of FIG. 2 is shown to comprise a processor(s) 210 connected (e.g., communicatively coupled) to the sensors 230a, 230b, 230c, 230d, 235a, 235b. The processor(s) 210 is also connected (e.g., communicatively coupled) to the primary flight controls 240 of the aircraft 110 as well as to a pedal autopilot actuator (e.g., a conventional autopilot backdrive actuator) 220a and a control yoke autopilot actuator 220b (e.g., a conventional autopilot backdrive actuator).

An autopilot actuator (e.g., a pedal autopilot actuator 220a and a control yoke autopilot actuator 220b) is a device that physically moves the aircraft controls (e.g., the controls yokes 130a, 130b or rudder pedals 140a, 140b, 140c, 140d) when the aircraft 110 is operating in autopilot mode. In older applications, the autopilot actuator (e.g., a pedal autopilot actuator 220a and a control yoke autopilot actuator 220b) physically moves the aircraft controls to control the flight of the aircraft 110, when the aircraft 110 is operating in autopilot mode. In newer applications, in autopilot mode, the flight of the aircraft 110 is not controlled by the movement of the aircraft controls, but rather the flight of the aircraft 110 is controlled by flight software. For these newer applications, the autopilot actuator (e.g., a pedal autopilot actuator 220a and a control yoke autopilot actuator 220b) moves the aircraft controls according to the movements of the flight of the aircraft 110 to provide a reference of the movements of the aircraft 110 to the pilots. Many aircraft with fully-powered flight control systems comprise a conventional autopilot actuator (e.g., a pedal autopilot actuator 220a and a control yoke autopilot actuator 220b). In one or more embodiments, the system 200 may comprise more than two autopilot actuators (e.g., a pedal autopilot actuator 220a and a control yoke autopilot actuator 220b) than as is depicted in FIG. 2.

Currently, conventional autopilot actuators (e.g., a pedal autopilot actuator 220a and a control yoke autopilot actuator 220b) installed on aircraft 110 are configured to be operable in only one mode (which is an autopilot mode), when the aircraft 110 is operating itself in an autopilot mode (e.g., the aircraft 110 is controlled (flown) by autopilot software). However, for the disclosed system 200, the autopilot actuators (i.e. the pedal autopilot actuator 220a and the control yoke autopilot actuator 220b) are also configured to be operable in a second mode (which is a torque-commanded mode), when commanded to do so by the processor(s) 210, during a pilot-controlled flight (i.e. not flown in an autopilot mode) of the aircraft 110.

Figure 3:
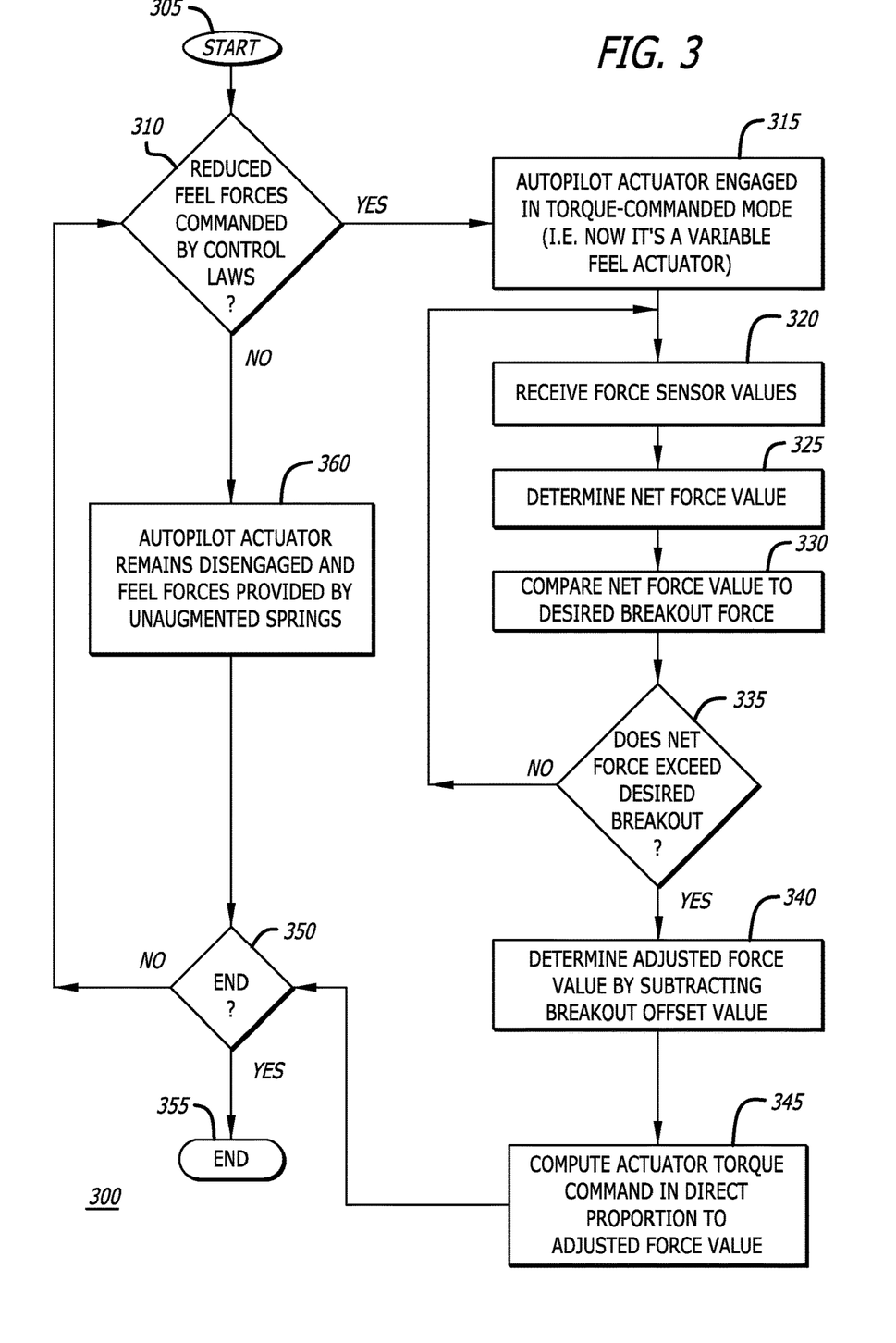
FIG. 3 is a flow chart showing the disclosed method for providing continuously variable feel forces for control yokes of an aircraft with a fully-powered flight control system, in accordance with at least one embodiment of the present disclosure.
Figure 4:
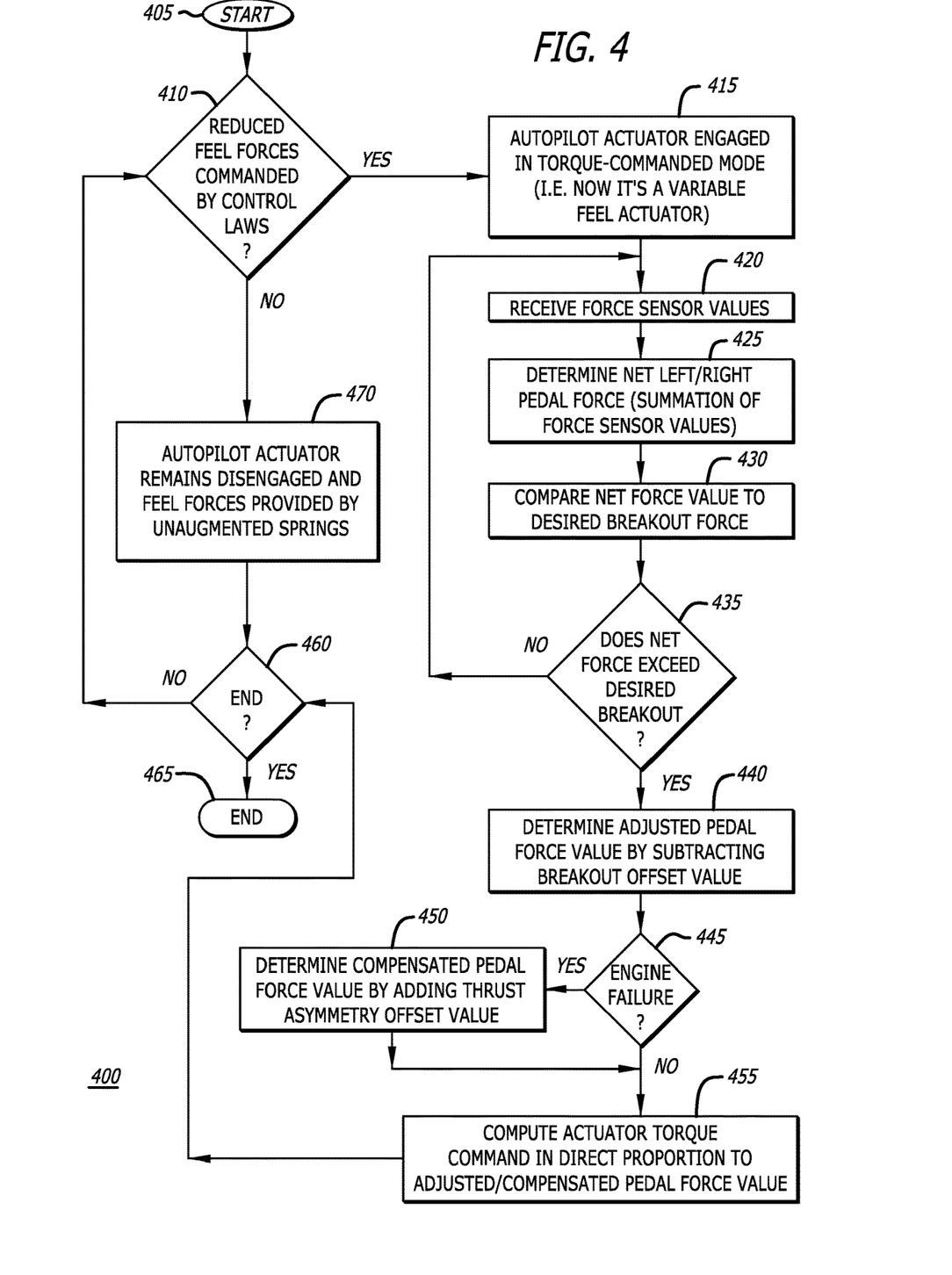
FIG. 4 is a flow chart showing the disclosed method for providing continuously variable feel forces for rudder pedals of an aircraft with a fully-powered flight control system, in accordance with at least one embodiment of the present disclosure.

The operation of the system 200 of FIG. 2 is discussed in the description of FIGS. 3 and 4. In particular, FIG. 3 is a flow chart showing the disclosed method 300 for providing continuously variable feel forces for the control yokes (e.g., control yoke 130a and 130b of FIG. 1) for an aircraft (e.g., aircraft 110 of FIG. 1) with a fully-powered flight control system, in accordance with at least one embodiment of the present disclosure. It should be noted that, during the disclosed method 300, the aircraft 110 is being controlled (flown) by the pilot(s) (i.e. the aircraft 110 is not being flown in an autopilot mode (e.g., flown by software)).

In this figure, at the start 305 of the method 300 of operation of the system 200, at least one processor (e.g., processor(s) 210 of FIG. 2) determines whether reduced feel forces for the control yokes (e.g., control yoke 130a and 130b of FIG. 1) are desired (e.g., are commanded by control laws) 310. Reduced feel forces for aircraft controls (e.g., control yokes 130a, 130b of FIG. 1) may be desired based on the phase of flight (e.g., during takeoff) of the aircraft 110. For example, it may be desirable to provide a lower artificial resistive "feel" force on the control yokes 130a, 130b as the pilot(s) is pulling back on the control yoke(s) 130a, 130b (i.e. pulling the control yoke(s) 130a, 130b in towards the pilot's chest) to raise the nose of the aircraft 110 during takeoff of the aircraft 110.

If the processor(s) 210 determines that it is desirable to have reduced feel forces for the control yokes 130a, 130b, the processor(s) 210 will then send a command to an autopilot actuator (e.g., the control yoke autopilot actuator

220b of FIG. 2) to command the autopilot actuator 220b to engage in a torque-commanded mode, which is not the same as an autopilot mode of operation for the autopilot actuator 220b. After the autopilot actuator 220b receives the command to engage in torque-commanded mode, the autopilot actuator 220b will engage itself in torque-commanded mode 315.

Then, at least one sensor (e.g., sensor 235a and 235b of FIG. 2) associated with each of the control yokes (e.g., control yoke 130a and 130b of FIG. 1) will sense (receive) a force being exerted on the control yokes 130a, 130b by the pilot(s) (e.g., the amount of force the pilot(s) is pulling back on the control yoke(s) 130a, 130b). The sensors 235a, 235b associated with each of the control yokes 130a, 130b will then send force sensor values, which corresponds to the amount of force sensed (e.g., 10 pounds (lb) of force), to the processor(s) 210. For example, the force sensor values are dependent upon how much force the pilot(s) is pulling back on the control yokes 130a, 130b. The processor(s) 210 will receive the force sensor values from each sensor 235a, 235b associated with the control yokes (e.g., control yoke 130a and 130b of FIG. 1) 320.

After the processor(s) 210 receives the force sensor values from each sensor 235a, 235b, the processor(s) 210 determines a net force value for the control yokes 130a, 130b by using the force sensor values 325. The net force value is the total amount of force being exerted on the control yokes (e.g., control yoke 130a and 130b of FIG. 1) by the pilot(s).

After the processor(s) 210 determines the net force value, the processor(s) 210 compares the net force value (e.g., 10 lb of force) to a desired breakout force (e.g., 7 lb of force) for the control yokes (e.g., control yoke 130a, 130b) 330. In one or more embodiments, the desired breakout force is a predetermined force for the control yokes 130b, 130b. The processor(s) 210 then determines whether the net force value (e.g., 10 lb of force) exceeds the desired breakout force (e.g., 7 lb of force) 335.

If the processor(s) 210 determines that the net force value does not exceed the desired breakout force, the method proceeds to step 320. However, if the processor(s) 210 determines that the net force values does exceed the desired breakout force, the processor(s) 210 determines an adjusted force value by using the desired breakout force and the net force value. In one or more embodiments, the processor(s) 210 determines the adjusted force value (e.g., 3 lb of force) by subtracting the desired breakout force (e.g., 7 lb of force) from the net force value (e.g., 10 lb of force) 340.

After the processor(s) 210 determines the adjusted force value (e.g., 3 lb of force), the processor(s) 210 computes and generates an actuator torque command based on (e.g., in direct proportion to) the adjusted force value 345. The processor(s) 210 then sends the actuator torque command to the autopilot actuator (e.g., the control yoke autopilot actuator 220b of FIG. 2) to command the autopilot actuator 220b to apply a force in proportion to the adjusted force value (e.g., 3 lb of force) to the control yokes 130a, 130b such that artificial resistive "feel" force on the control yokes 130a, 130b to the pilot(s) is lessened. Once the autopilot actuator 220b receives the actuator torque command, the autopilot actuator 220b applies a force in proportion to the adjusted force value (e.g., 3 lb of force) to the control yokes 130a, 130b.

Then, the processor(s) determines whether the autopilot actuator 220b should stop (end) applying the force in proportion to the adjusted force value to the control yokes (e.g., control yoke 130a, 130b) 350. For example, the processor(s) 210 may determine whether the autopilot actuator 220b should stop applying the force based on whether the phase of flight has ended (e.g., the aircraft 110 is no longer in the takeoff phase of flight and has reached its cruising altitude). If the processor(s) 210 determines that the autopilot actuator 220b should not stop applying the force, the method 300 proceeds back to step 310 to recalculate and confirm the force to be applied. However, if the processor(s) 210 determines that the autopilot actuator 220b should stop applying the force, the method 300 ends 355.

However, if the processor(s) 210 determines that it is not desirable to have reduced feel forces for the control yokes 130a, 130b, the autopilot actuator 220b will remain disengaged, and the artificial "feel" forces will simply be provided to the control yokes 130a, 130b by the un-augmented spring mechanism of the aircraft 110, 360. Then, the method 300 proceeds to step 350.

FIG. 4 is a flow chart showing the disclosed method 400 for providing continuously variable feel forces for rudder pedals (e.g., rudder pedals 140a, 140b, 140c, 140d of FIG. 1) of an aircraft (e.g., aircraft 110 of FIG. 1) with a fully-powered flight control system, in accordance with at least one embodiment of the present disclosure. It should be noted that, during the disclosed method 400, the aircraft 110 is being controlled (flown) by the pilot(s) (i.e. the aircraft 110 is not being flown in an autopilot mode (e.g., flown by software)).

In this figure, at the start 405 of the method 400 of operation of the system 200, at least one processor (e.g., processor(s) 210 of FIG. 2) determines whether reduced feel forces for the rudder pedals (e.g., rudder pedals 140a, 140b, 140c, 140d of FIG. 1) are desired (e.g., are commanded by control laws) 410. Reduced feel forces for an aircraft control (e.g., rudder pedals 140a, 140b, 140c, 140d of FIG. 1) may be desired based on the phase of flight (e.g., during landing) of the aircraft 110. For example, it may be desirable to provide a lower artificial resistive "feel" force to the rudder pedals 140a, 140b, 140c, 140d as the pilot(s) is landing the aircraft 110.

If the processor(s) 210 determines that it is desirable to have reduced feel forces for the rudder pedals (e.g., rudder pedals 140a, 140b, 140c, 140d of FIG. 1), the processor(s) 210 will then send a command to an autopilot actuator (e.g., a pedal autopilot actuator 220a of FIG. 2) to command the autopilot actuator 220a to engage in a torque-commanded mode, which is not the same as an autopilot mode of operation for the autopilot actuator 220a. After the autopilot actuator 220a receives the command to engage in torque-commanded mode, the autopilot actuator 220a will engage itself in torque-commanded mode 415.

Then, at least one sensor (e.g., sensor 230a, 230b, 230c, 230d of FIG. 2) associated with the rudder pedals (e.g., rudder pedals 140a, 140b, 140c, 140d of FIG. 1) will sense (receive) a force being exerted on each of the rudder pedals 140a, 140b, 140c, 140d by the pilot(s) (e.g., the amount of force the pilot(s) is depressing (pushing down) on each of the rudder pedals). Each of the sensor(s) 230a, 230b, 230c, 230d associated with the rudder pedals 140a, 140b, 140c, 140d will then send a force sensor value, which corresponds to the amount of force sensed (e.g., lb of force), to the processor(s) 210. For example, the force sensor value is dependent upon how much force the pilot(s) is pushing down on a rudder pedal 140a, 140b, 140c, 140d. In one or more embodiments, the force sensor value for the force sensed on a left rudder pedal (e.g., rudder pedals 140a and 140c) is a positive value, and the force sensor value for the force sensed on a right rudder pedal (e.g., rudder pedals 140b and 140d) is a negative value. The processor(s) 210 will receive the force sensor value from each sensor 230*a*, 230*b*, 230*c*, 230*d* associated with each rudder pedal (e.g., rudder pedals 140*a*, 140*b*,140*c*, 140*d*) 420.

After the processor(s) 210 receives the force sensor value from each sensor 230*a*, 230*b*, 230*c*, 230*d* the processor(s) 210 determines a net force value (e.g., 30 lb of force) for the rudder pedals (e.g., rudder pedals 140*a*, 140*b*, 140*c*, 140*d*) by using the force sensor values 425. The net force value is the total amount of force (e.g., the force sensor values are summed together) being exerted on the rudder pedals (e.g., rudder pedals 140*a*, 140*b*, 140*c*, 140*d*) by the pilot(s).

After the processor(s) 210 determines the net force value, the processor(s) 210 compares the net force value (e.g., 30 lb of force) to a desired breakout force (e.g., 22 lb of force) for the rudder pedals (e.g., rudder pedals 140*a*, 140*b*, 140*c*, 140*d*) 430. In one or more embodiments, the desired breakout force is a predetermined force for the rudder pedals (e.g., rudder pedals 140*a*, 140*b*, 140*c*, 140*d*). The processor(s) 210 then determines whether the net force value (e.g., 30 lb of force) exceeds the desired breakout force (e.g., 22 lb of force) 435.

If the processor(s) 210 determines that the net force value does not exceed the desired breakout force, the method proceeds to step 420. However, if the processor(s) 210 determines that the net force values does exceed the desired breakout force, the processor(s) 210 determines an adjusted force value (e.g., an adjusted pedal force value) by using the desired breakout force and the net force value. In one or more embodiments, the processor(s) 210 determines the adjusted force value (e.g., 8 lb of force) by subtracting the desired breakout force (e.g., 22 lb of force) from the net force value (e.g., 30 lb of force) 440.

After the processor(s) 210 determines the adjusted force value (e.g., 8 lb of force), the processor(s) 210 optionally determines whether there is an engine failure (e.g., either a left engine failure or a right engine failure) on the aircraft 110, 445. If the processor(s) 210, determines that there is not an engine failure on the aircraft 110, the processor(s) 210 computes and generates an actuator torque command based on (in direct proportion to) the adjusted force value 455. The processor(s) 210 then sends the actuator torque command to the autopilot actuator 220*a* to command the autopilot actuator 220*a* to apply a force in proportion to the adjusted force value (e.g., 8 lb of force) to the rudder pedals (e.g., rudder pedals 140*a*, 140*b*, 140*c*, 140*d*) such that artificial resistive "feel" force on the rudder pedals 140*a*, 140*b*, 140*c*, 140*d* to the pilot(s) is lessened. Once the autopilot actuator 220*a* receives the actuator torque command, the autopilot actuator 220*a* applies a force in proportion to the adjusted force value (e.g., 8 lb of force) to the rudder pedals (e.g., rudder pedals 140*a*, 140*b*, 140*c*, 140*d*).

However, if the processor(s) 210, determines that there is an engine failure on the aircraft 110, the processor(s) 210 will determine a compensated pedal force value by adding a thrust asymmetry offset value to the adjusted force value (e.g., 8 lb of force) 450. The processor(s) 210 determines the thrust asymmetry offset value based on the engine failure. For example, if there is a right engine failure, the aircraft 110 will have more thrust on the left side of the aircraft 110, and the aircraft 110 will pull to the right during flight. Conversely, if there is a left engine failure, the aircraft 110 will have more thrust on the right side of the aircraft 110, and the aircraft 110 will pull to the left during flight. The thrust asymmetry offset value (e.g., an amount of force in lb) will aid to counter the asymmetry in flight of the aircraft 110 (e.g., cause the aircraft 110 to not pull to either side). The thrust asymmetry offset value will be a positive value (e.g., 5 lb of force) for a right engine failure, and the thrust offset value will be a negative value (e.g., −5 lb of force) for a left engine failure.

For this example, we will assume that there is a right engine failure, and that the processor(s) 210 determines that the thrust offset asymmetry value is +5 lb of force. After the processor(s) 210 determines the thrust offset asymmetry value (e.g., +5 lb of force), the processor(s) 210 computes and generates an actuator torque command based on (in direct proportion to) the compensated pedal force value 455. Note that the compensated pedal force value (e.g., 13 lb of force) will be equal to the adjusted force value (e.g., 8 lb of force) added to the thrust offset asymmetry value (e.g., +5 lb of force). Since, for this example, there is a right engine failure, a force in proportion to the compensated pedal force value (e.g., 13 lb of force) will be applied to the rudder pedals 140*a*, 140*b*, 140*c*, 140*d*.

The processor(s) 210 then sends the actuator torque command to the autopilot actuator 220*a* to command the autopilot actuator 220*a* to apply a force in proportion to the compensated pedal force value (e.g., 13 lb of force) to the rudder pedals 140*a*, 140*b*, 140*c*, 140*d* such that artificial resistive "feel" force on the left rudder pedals 140*a*, 140*c* to the pilot(s) is lessened. Once the autopilot actuator 220*a* receives the actuator torque command, the autopilot actuator 220 applies a force in proportion to the compensated pedal force value (e.g., 13 lb of force) to the rudder pedals 140*a*, 140*b*, 140*c*, 140*d*.

Then, the processor(s) determines whether the autopilot actuator 220*a* should stop (end) applying the force in proportion to the adjusted force value to the rudder pedals (e.g., rudder pedals 140*a*, 140*b*, 140*c*, 140*d*) 460. For example, the processor(s) 210 may determine whether the autopilot actuator 220*a* should stop applying the force based on whether the phase of flight has ended (e.g., the aircraft 110 is no longer in the landing phase of flight and has landed on the runway). If the processor(s) 210 determines that the autopilot actuator 220*a* should not stop applying the force, the method 400 proceeds back to step 410 to recalculate and confirm the force to be applied. However, if the processor(s) 210 determines that the autopilot actuator 220*a* should stop applying the force, the method 400 ends 465.

However, if the processor(s) 210 determines that it is not desirable to have reduced feel forces for the rudder pedals (e.g., rudder pedals 140*a*, 140*b*, 140*c*, 140*d*), the autopilot actuator 220*a* will remain disengaged, and the artificial "feel" forces will simply be provided to the rudder pedals 140*a*, 140*b*, 140*c*, 140*d* by the un-augmented spring mechanism of the aircraft 110, 470. Then, the method 400 proceeds to step 460.

Figure 5:
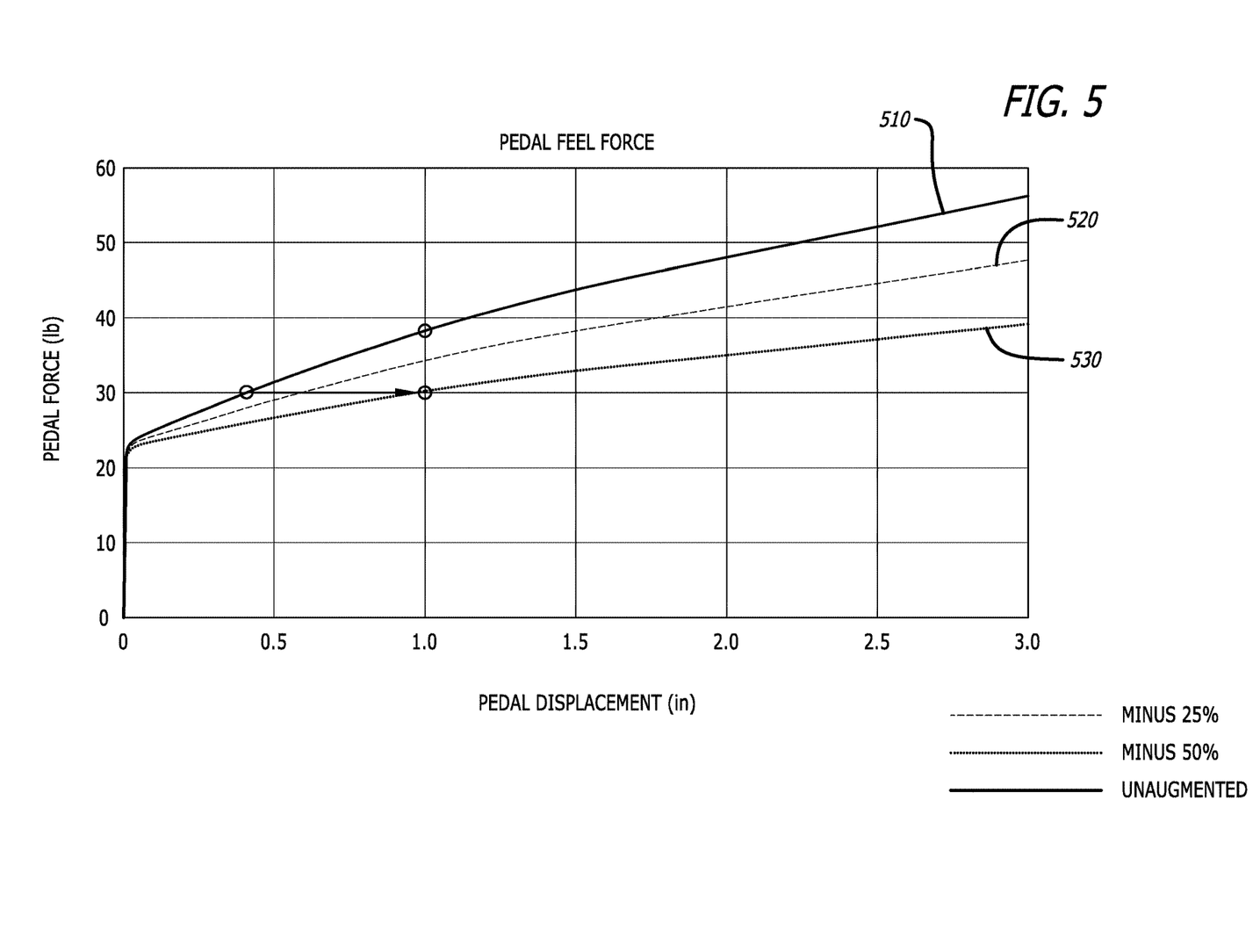
FIG. 5 is a graph showing exemplary rudder pedal forces, in accordance with at least one embodiment of the present disclosure.

FIG. 5 is a graph 500 showing exemplary rudder pedal forces, in accordance with at least one embodiment of the present disclosure. The x-axis of the graph 500 denotes rudder pedal displacement in inches, and the y-axis of the graph 500 denotes rudder pedal force in pounds. Curve 510 on the graph 500 represents the actual rudder pedal (e.g., pedal 140*a*, 140*b*, 140*c*, or 140*d*) force produced by the conventional spring mechanism attached to the rudder pedal (e.g., rudder pedal 140*a*, 140*b*, 140*c*, or 140*d*) of the aircraft 110. Curve 520 on the graph 500 represents the force felt by the pilot assisted (by minus 25%) by the autopilot actuator 220*a* while operating in the torque-commanded mode. And, curve 530 on the graph 500 represents the force felt by the pilot assisted (by minus 50%) by the autopilot actuator 220*a* while operating in the torque-commanded mode. It should be noted that although the graph 500 is directed to a rudder pedal (e.g., rudder pedal 140a, 140b, 140c, or 140d), a graph directed to a control yoke (e.g., control yoke 130a or 130b) would have similar curves.

The curves 510, 520, 530 on graph 500 illustrate that, with the autopilot actuator 220a operating in torque-commanded mode, the rudder pedal will travel the same distance with less force needed to be provided by the pilot. For example, curve 510 shows that approximately 38 lb of force is needed to be applied by the pilot to the rudder pedal to move the rudder pedal one (1) inch, curve 520 shows that only approximately 34 lb of force is needed to be applied by the pilot to the rudder pedal to move the rudder pedal one inch, and curve 530 shows that only approximately 30 lb of force is needed to be applied by the pilot to the rudder pedal to move the rudder pedal one inch.

In addition, the curves 510, 530 on graph 500 show that, with the autopilot actuator 220a operating in torque-commanded mode, the rudder pedal will move a further distance with the same amount of force being applied. For example, curve 510 shows that with 30 lb of force being applied by the pilot to the rudder pedal, the rudder pedal will travel only 0.4 inches. And, curve 530 shows that with the same 30 lb of force being applied by the pilot to the rudder pedal, the rudder pedal will travel 1 inch.

Figure 6:
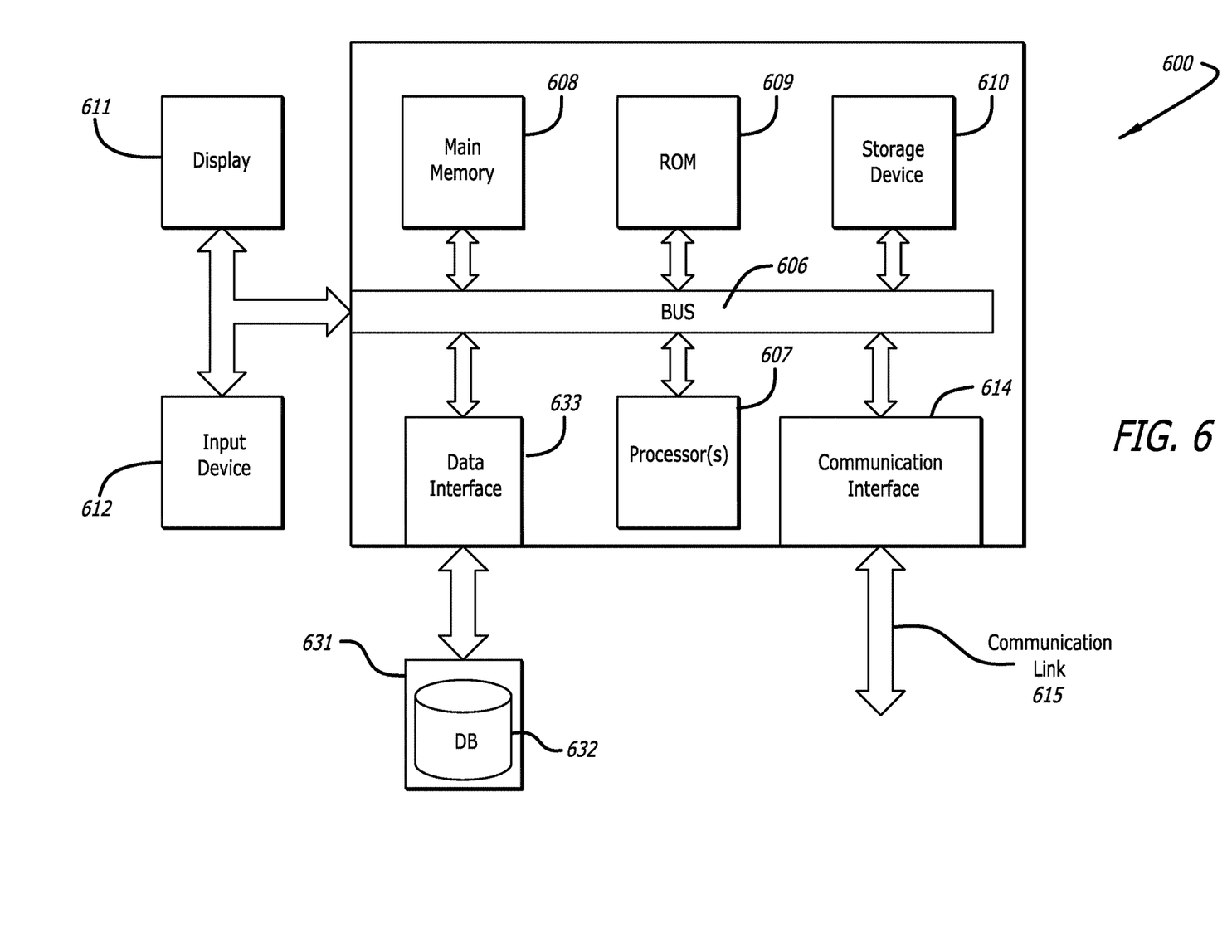
FIG. 6 illustrates a block diagram of an illustrative computing system suitable for implementing an embodiment of the present disclosure, in accordance with at least one embodiment of the present disclosure.

FIG. 6 illustrates a block diagram of an illustrative computing system 600 suitable for implementing an embodiment of the present disclosure, in accordance with at least one embodiment of the present disclosure. For example, at least one processor (e.g., processor(s) 210 of FIG. 2) of the disclosed system (e.g., system 200 of FIG. 2) may include and/or employ at least a portion of the disclosed computer system 600. Computing system 600 includes a bus 606 or other communication mechanism for communicating information, which interconnects subsystems and devices, such as processor(s) 607, system memory 608 (e.g., random access memory (RAM)), static storage device 609 (e.g., read only memory (ROM)), disk drive 610 (e.g., magnetic or optical), communication interface 614 (e.g., modem or Ethernet card), display 611 (e.g., cathode ray tube (CRT) or liquid crystal display (LCD)), input device 612 (e.g., keyboard), and cursor control (not shown).

According to one embodiment of the present disclosure, computer system 600 performs specific operations by processor(s) 607 executing one or more sequences of one or more instructions contained in system memory 608. Such instructions may be read into system memory 608 from another computer readable/usable medium, such as static storage device 609 or disk drive 610. In alternative embodiments, hard-wired circuitry may be used in place of or in combination with software instructions to implement the present disclosure. Thus, embodiments of the present disclosure are not limited to any specific combination of hardware circuitry and/or software. In one embodiment, the term "logic" shall mean any combination of software or hardware that is used to implement all or part of the present disclosure.

The term "computer readable medium" or "computer usable medium" as used herein refers to any medium that participates in providing instructions to processor(s) 607 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 608.

Common forms of computer readable media include, for example, floppy disk, flexible disk, hard disk, magnetic tape, any other magnetic medium, compact disc-read only memory (CD-ROM), any other optical medium, punch cards, paper tape, any other physical medium with patterns of holes, RAM, programmable read only memory (PROM), erasable programmable read only memory (EPROM), FLASH-EPROM, any other memory chip or cartridge, or any other medium from which a computer can read.

In an embodiment of the present disclosure, execution of the sequences of instructions to practice the present disclosure is performed by a single computer system 600. According to other embodiments of the present disclosure, two or more computer systems 600 coupled by communication link 615 (e.g., local area network (LAN), public switched telephone network (PTSN), or wireless network) may perform the sequence of instructions required to practice the present disclosure in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. Computer system 600 may also interact with a database 632 within a database system 631 via a data interface 633 where the computer system 600 may store and retrieve information or data of the electronic design into and from the database system 631.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A method for providing continuously variable feel forces for an aircraft, the method comprising:
   sensing, by each of at least one sensor associated with at least one aircraft control, a force sensor value;
   determining, by at least one processor, a net force value by using the force sensor value for each of the at least one sensor;

comparing, by the at least one processor, the net force value to a desired breakout force;
determining, by the at least one processor, whether the net force value exceeds the desired breakout force;
determining, by the at least one processor, an adjusted force value by using the desired breakout force and the net force value, when the net force value exceeds the desired breakout force;
determining, by the at least one processor, an actuator torque command based on the adjusted force value; and
commanding, by the at least one processor, an autopilot actuator with the actuator torque command to apply torque.

2. The method of claim 1, wherein there are at least two of the at least one sensor.

3. The method of claim 2, wherein the at least two sensors are associated with control yokes of the aircraft.

4. The method of claim 2, wherein at least one of the sensors is associated with a right rudder pedal, and another one of at least one of the sensors is associated with a left rudder pedal.

5. The method of claim 4, wherein the method further comprises determining, by the at least one processor, whether there is an engine failure on the aircraft.

6. The method of claim 5, wherein the method further comprises determining, by the at least one processor, a thrust asymmetry offset value, when there is an engine failure.

7. The method of claim 6, wherein the method further comprises determining, by the at least one processor, a compensated pedal force value based on the adjusted force value and the thrust asymmetry offset value.

8. The method of claim 1, wherein the desired breakout force is predetermined.

9. The method of claim 1, wherein the method further comprises determining, by the at least one processor, whether reduced feel forces for the at least one aircraft control associated with each of the at least one sensor are desired.

10. The method of claim 9, wherein the method further comprises engaging, by the autopilot actuator, in torque-commanded mode, when reduced feel forces are desired.

11. The method of claim 9, wherein the at least one processor determines whether reduced feel forces are desired based on a phase of flight of the aircraft.

12. The method of claim 1, wherein the autopilot actuator is one of a pedal autopilot actuator or a control yoke autopilot actuator.

13. A system for providing continuously variable feel forces for an aircraft, the system comprising:
at least one aircraft control;
at least one sensor associated with each of the at least one aircraft control, wherein each of the at least one sensor is configured to sense a force sensor value; and
at least one processor configured:
to determine a net force value by using the force sensor value for each of the at least one sensor,
to compare the net force value to a desired breakout force,
to determine whether the net force value exceeds the desired breakout force,
to determine an adjusted force value by using the desired breakout force and the net force value, when the net force value exceeds the desired breakout force,
to determine an actuator torque command based on the adjusted force value, and
to command an autopilot actuator with the actuator torque command to apply torque.

14. The system of claim 13, wherein there are at least two of the at least one sensor.

15. The system of claim 14, wherein the at least two sensors are associated with control yokes of the aircraft.

16. The system of claim 14, wherein at least one of the sensors is associated with a right rudder pedal, and another one of at least one of the sensors is associated with a left rudder pedal.

17. The system of claim 16, wherein the at least one processor is further configured to determine whether there is an engine failure on the aircraft.

18. The system of claim 17, wherein the at least one processor is further configured to determine a thrust asymmetry offset value, when there is an engine failure.

19. The system of claim 18, wherein the at least one processor is further configured to determine a compensated pedal force value based on the adjusted force value and the thrust asymmetry offset value.

20. The system of claim 13, wherein the desired breakout force is predetermined.

* * * * *

UNITED STATES PATENT AND TRADEMARK OFFICE
CERTIFICATE OF CORRECTION

PATENT NO. : 11,649,040 B2
APPLICATION NO. : 17/338300
DATED : May 16, 2023
INVENTOR(S) : Joseph E. Elliott It is certified that error appears in the above-identified patent and that said Letters Patent is hereby corrected as shown below:

On the Title Page

Item (73), change "Assignee: Tlie Boeing Company" to --Assignee: The Boeing Company--.

Signed and Sealed this
Fourth Day of July, 2023

Katherine Kelly Vidal
*Director of the United States Patent and Trademark Office*